US007109990B1

(12) United States Patent
Oler et al.

(10) Patent No.: US 7,109,990 B1
(45) Date of Patent: Sep. 19, 2006

(54) CIRCUIT AND METHOD FOR TEMPERATURE COMPENSATED CONTRAST

(75) Inventors: Van Oler, Redmond, WA (US); David Mai, Shoreline, WA (US); Ken Kelly, Carnation, WA (US)

(73) Assignee: Palm, Inc., Sunnyvale, CA (US)

( * ) Notice: Subject to any disclaimer, the term of this patent is extended or adjusted under 35 U.S.C. 154(b) by 496 days.

(21) Appl. No.: 09/724,811

(22) Filed: Nov. 28, 2000

(51) Int. Cl.
*G06T 17/00* (2006.01)
*G09G 3/36* (2006.01)
*G02F 1/133* (2006.01)

(52) U.S. Cl. .......................... 345/428; 345/101; 349/72

(58) Field of Classification Search ................. 345/428, 345/617, 91, 684, 101, 648; 349/72; 715/528
See application file for complete search history.

(56) References Cited

U.S. PATENT DOCUMENTS 5,029,982 A * 7/1991 Nash ........................... 349/72
5,532,715 A * 7/1996 Bates et al. ................. 345/684
6,285,421 B1 * 9/2001 Lutnaes ....................... 349/72
6,313,821 B1 * 11/2001 Mizuno ....................... 345/101
6,433,769 B1 * 8/2002 Cato .......................... 345/101
6,496,177 B1 * 12/2002 Burton ....................... 345/101
6,501,450 B1 * 12/2002 Bjerke ......................... 345/84
6,512,506 B1 * 1/2003 Shimada ...................... 345/99

* cited by examiner

*Primary Examiner*—Richard Hjerpe
*Assistant Examiner*—Michelle K. Lay

(57) ABSTRACT

A circuit and method for automatically compensating display contrast for temperature changes allowing user preference setting. The invention can be applied to any device having a display, but in one embodiment, portable electronic devices such as palmtops, other portable computers, personal digital assistants, cellular telephones, portable web browsers, remote controls, pagers, etc. are described herein. The invention allows a user to set a desired contrast preference and provides display feedback to the user as the preference setting is being made. Once the preference is set, the invention automatically compensates the contrast adjustment based on variable temperature conditions to maintain the display according to the user preference. For instance, as the temperature falls, the invention automatically detects this and adjusts the contrast in a first direction to maintain the user preference. Alternatively, as the temperature rises, the invention automatically adjusts contrast in a second direction to maintain the user preference.

16 Claims, 10 Drawing Sheets

100a

100b

600

| TEMP. | CONTRAST ADJ. |
|---|---|
| 0 | 5 |
| 5 | 7 |
| 10 | 10 |
| 15 | 14 |
| 20 | 19 |
| 25 | 25 |
| 30 | 32 |
| 35 | 40 |
| 40 | |

FIGURE 9A

CIRCUIT AND METHOD FOR TEMPERATURE COMPENSATED CONTRAST

BACKGROUND OF THE INVENTION

1. Field of the Invention

The present invention relates to the field of portable devices such as personal digital assistants or palmtop computer systems. Specifically, the present invention relates to a method and apparatus for controlling contrast on displays of such devices to maintain user preference settings, automatically compensating for changes in temperature with no required user action.

2. Related Art

As the components required to build a computer system have reduced in size, new categories of computer systems have emerged. One of the more recent categories of computer systems is the portable or "palmtop" computer system, or personal digital assistant (PDA). A palmtop computer system includes a palm-held device and a cradle device to which it ports and which connects and synchronizes it to other computers. Due to the small size and portability of the palm-held devices, they may be brought into and used in any environment, and thus experience widely different ambient temperatures while in operation.

As the temperature changes, the contrast of the portable computer unit's LCD display changes. Under certain conditions, particularly with wide variations in temperature, the resulting change in contrast may cause the LCD display to become unreadable, perhaps either completely bright, if the temperature becomes too cold, or completely dark, if the temperature becomes too hot, and thus render the portable computer unusable, unless and until the contrast is readjusted by the user. For example, when the user leaves a heated building in the winter and goes outside and waits at a bus stop, they go from a warm to a cold temperature. If the display was set for the heated building, when the user is waiting at the bus stop, the display could get very bright so it could look like the screen never came on. Therefore, such display conditions may result in users mistaking their temperature-errant contrast display for a broken or inoperable display or computer, causing them to fear they have lost potentially important data, striving to replace such data and/or returning the units for repair or replacement unnecessarily. This is inconvenient and costly.

One method for solving this problem has been to simply rely upon manual contrast correction by the user upon temperature varying contrast. However, this solution is error prone and inconvenient as the user must realize that the contrast has varied due to temperature change and act accordingly, and this has resulted in confusion and error as discussed above.

Another method has been to limit the contrast range, such that the portable computer's display will never go either completely light or completely dark. However, the user would still have to adjust the contrast depending on the temperature of the environment in which they were operating the portable computer. Furthermore, this method does not allow the use of the full range of the contrast, and at the high and low ends of the operable portable computers' temperature range, the user could not set the unit's contrast optimally, because the controls become confusing to the user.

Yet another method has been to utilize a thermistor to provide automatic temperature contrast control with user manual contrast control potentiometer settings. However, thermistors have proven substantially incompatible with the potentiometers used for manual contrast control. This is because thermistors have relatively limited ranges and the resistance ranges available for thermistors do not overlap well with the resistance ranges available for the potentiometers used for manual contrast control.

SUMMARY OF THE INVENTION

Accordingly, what is needed is an apparatus and method that can accept a user preference for contrast setting but still monitor a portable computer's ambient operating temperature and adjust the unit's LCD display contrast to compensate for temperature generated contrast changes which is compatible with the user's contrast setting preferences. In one embodiment, the portable electronic device is a handheld computer system, but it could be a pager, a cell phone, portable web browsing device, remote control devices, etc.

A method and system are described for providing automatic contrast temperature-compensation for a flat panel display screen that allows a user preference setting. The present invention can be applied to any device having a screen, but in one embodiment a portable electronic device, e.g., portable digital assistant (PDA), palmtop computer, pager, cell phone, portable web browser, remote control unit, etc., is described herein. The system allows a user to set a desired contrast preference and provides display feedback to the user while the preference setting is made. Once the preference setting is made, the invention then provides automatic temperature compensation to adjust the contrast of the display screen based on variable temperature conditions. For instance, as the temperature becomes colder, the invention automatically detects this and adjusts the contrast in a first direction to maintain the user's preference, alternatively, as the temperature becomes warmer, the invention automatically adjusts the contrast in a second direction to maintain the user's preference. Various circuits can be used to provide the temperature sensing and display compensation features. In one embodiment, the system can effectively be employed within a portable, or hand-held, computer system. In one embodiment, a liquid crystal display (LCD) is the display screen.

In one embodiment, the present invention is directed to a method and apparatus for using a temperature sensitive circuit as a temperature sensor with an analog-digital (A/D) converter to monitor the ambient temperature in which a portable electronic device is operated. The corresponding signal is then supplied on a channel dedicated to temperature sensing to the unit's CPU, which will automatically adjust the LCD contrast voltage in compensation for temperature changes through a program routine in software. This will function to change the LCD display contrast correspondingly. This will allow the user of the portable electronic device to set the contrast initially and never have to change it again due to temperature variations. However, the user setting can be changed for their display preference, but not in a necessary response to temperature variations. The computer itself automatically makes any necessary contrast adjustments to compensate for temperature variations.

In one embodiment, an electronic device is described having a display and a processor, which is capable of providing contrast adjustment for the display by receiving a user defined contrast setting, generating signals representative of the ambient display temperature over time, sampling the temperature signals and in the processor converting them into current temperature values and computing a contrast adjustment voltage signal for maintaining the contrast setting based on the contrast setting and the current temperature values, and automatically adjusting the display contrast by applying the contrast adjustment voltage signal to the display.

In accordance with the present invention, the utility and convenience of electronic devices using LCD displays and portable computers in particular is greatly enhanced.

BRIEF DESCRIPTION OF THE DRAWINGS

FIG. 9A is a Table of Temperature-Contrast Adjustment Values that can be programmed for automatic temperature-contrast adjustment in accordance with one embodiment of the invention.

DETAILED DESCRIPTION OF THE INVENTION

Figure 1:
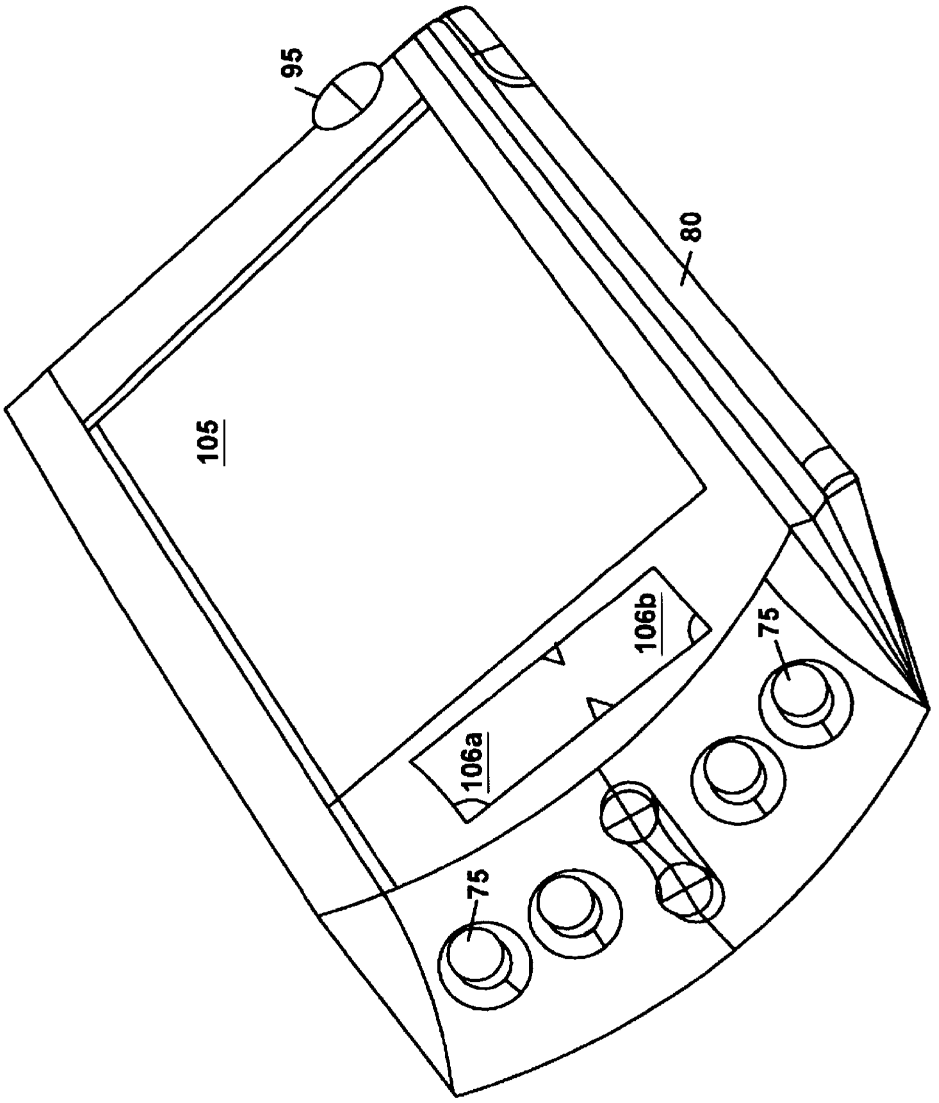
FIG. 1 is a top side perspective view of a portable computer system in accordance with one embodiment of the present invention.

In the following detailed description of the present invention, an automatic system for temperature based contrast adjustment with user specified contrast setting, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or. magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as “determining” or “indicating” or “indexing” or “receiving” or “performing” or “initiating” or “sending” or “implementing” or “disabling” or “enabling” or “displaying” or the like, refer to the action and processes of a computer system or similar electronic computing device, that manipulates and transforms data represented as physical (electronic) quantities within the computer system’s registers and memories into other data similarly represented as physical quantities within the computer system memories or registers or other such information storage, transmission or display devices.

The present invention is discussed in one example in the context of a portable computer system, such as a palmtop computer or personal digital assistant. However, it is appreciated that the present invention can be used with other types of devices that require temperature compensation of contrast settings to a display screen, e.g., pagers, cell phones, remote control devices, portable web browsers, etc.

FIG. 1 is a perspective illustration of the top face 100*a* of one embodiment of a palmtop computer system 100, that can be used with the present invention. The top face 100*a* contains a LCD display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100*a* also contains one or more dedicated and/or programmable buttons 75 for selecting information and causing the computer system to implement functions. The on/off button 95 is also shown.

FIG. 1 also illustrates a handwriting recognition pad or “digitizer” containing two regions 106*a* and 106*b*. Region 106*a* is for the drawing of alphabetic characters therein (and not for numeric characters) for automatic recognition, and region 106*b* is for the drawing of numeric characters therein (and not for alphabetic characters) for automatic recognition. The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 2:
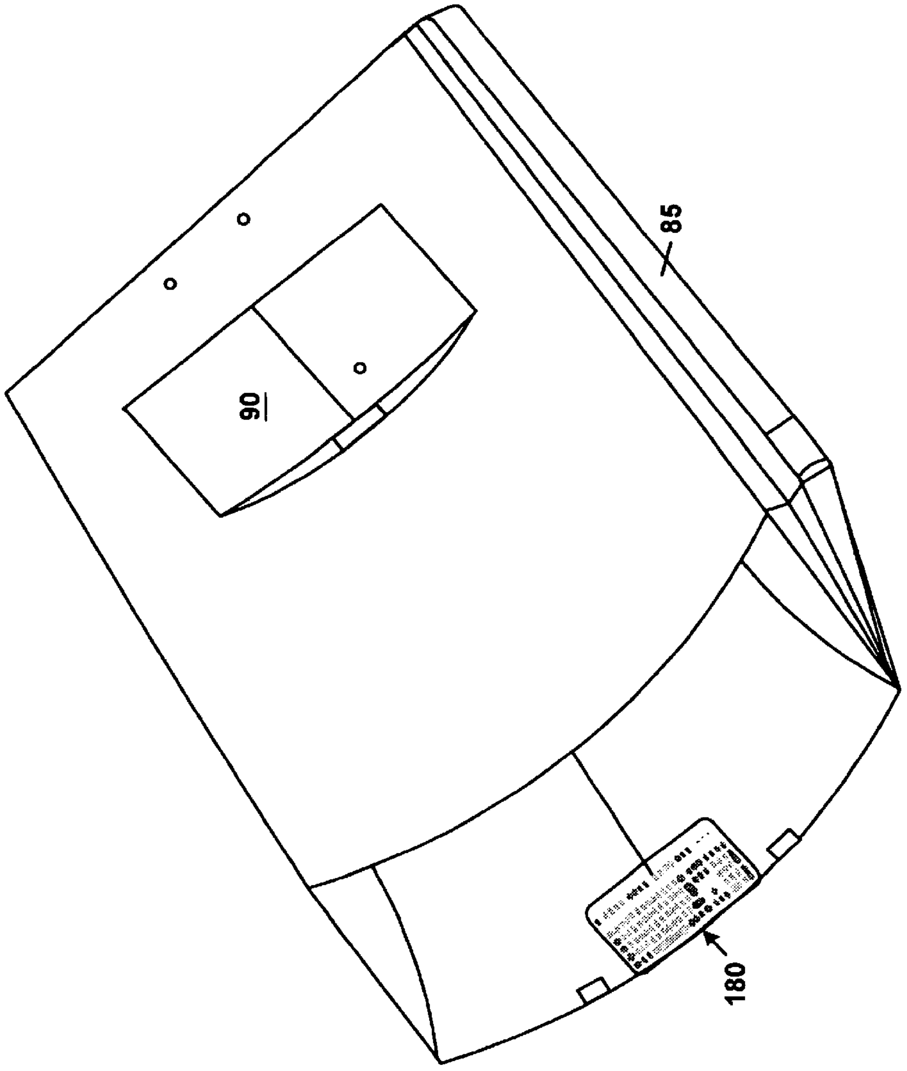
FIG. 2 is a bottom side perspective view of the portable computer system of FIG. 1.

FIG. 2 illustrates the bottom side 100*b* of one embodiment of the palmtop computer system that can be used in accordance with the present invention. An extendible antenna 85 is shown, and also a battery storage compartment door 90 is shown. A communication interface 180 is also shown.

Figure 3:
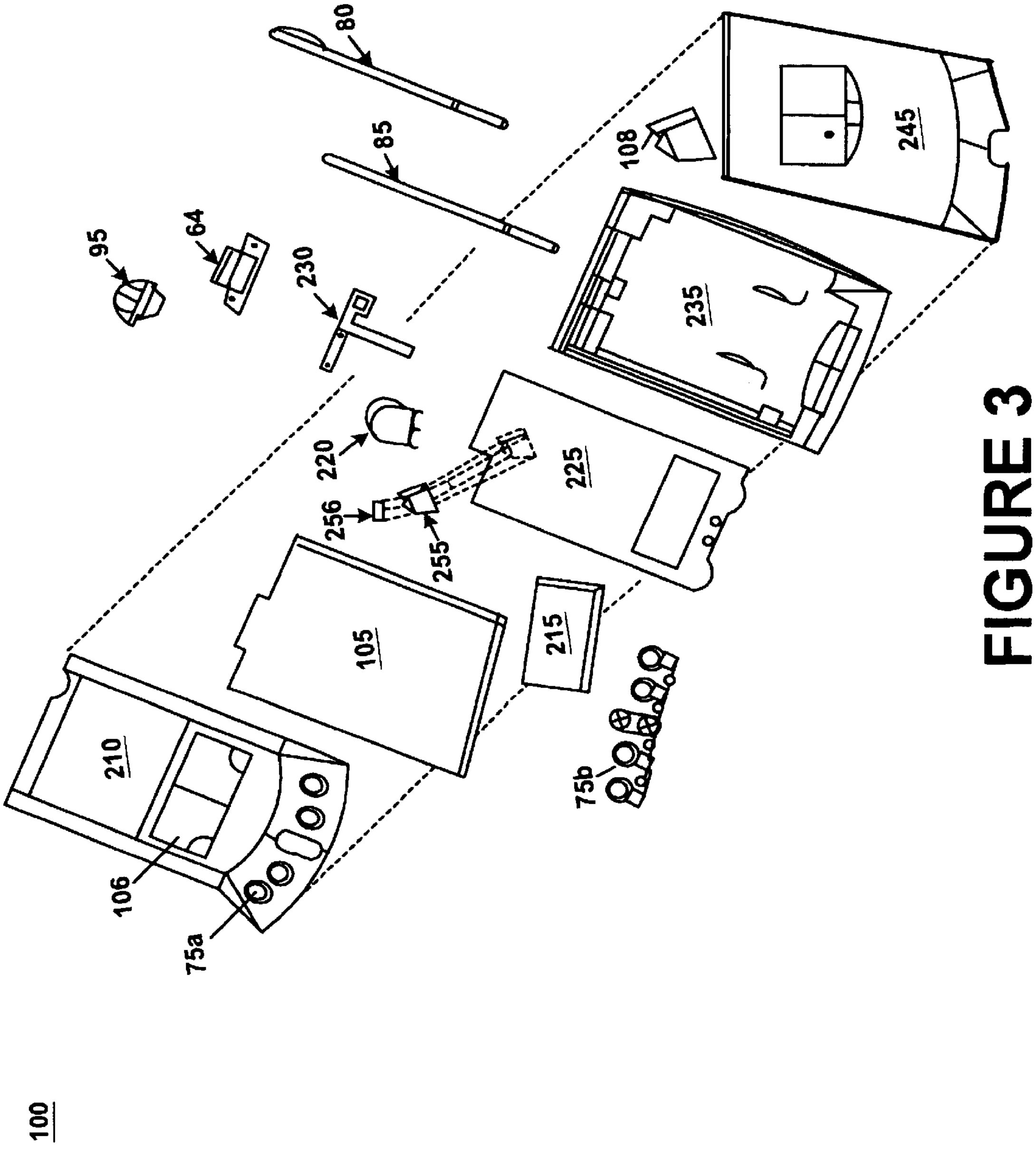
FIG. 3 is an exploded view of the components of the portable computer system of FIG. 1.

FIG. 3 is an exploded view of the palmtop computer system 100 in accordance with one implementation. Computer system 100 contains a back cover 245, and a front cover 210 having an outline of region 106 and holes 75*a* for receiving buttons 75*b*. A flat panel display 105 fits into front cover 210 and has contrast adjustment features. The flat panel display unit 105 in one embodiment is a liquid crystal display (LCD). A battery 215 provides electrical power. A manual contrast adjusting potentiometer 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown. Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. Also shown are diode 256 and A/D converter 255 which, in one embodiment are used as a temperature monitor.

Figure 4:
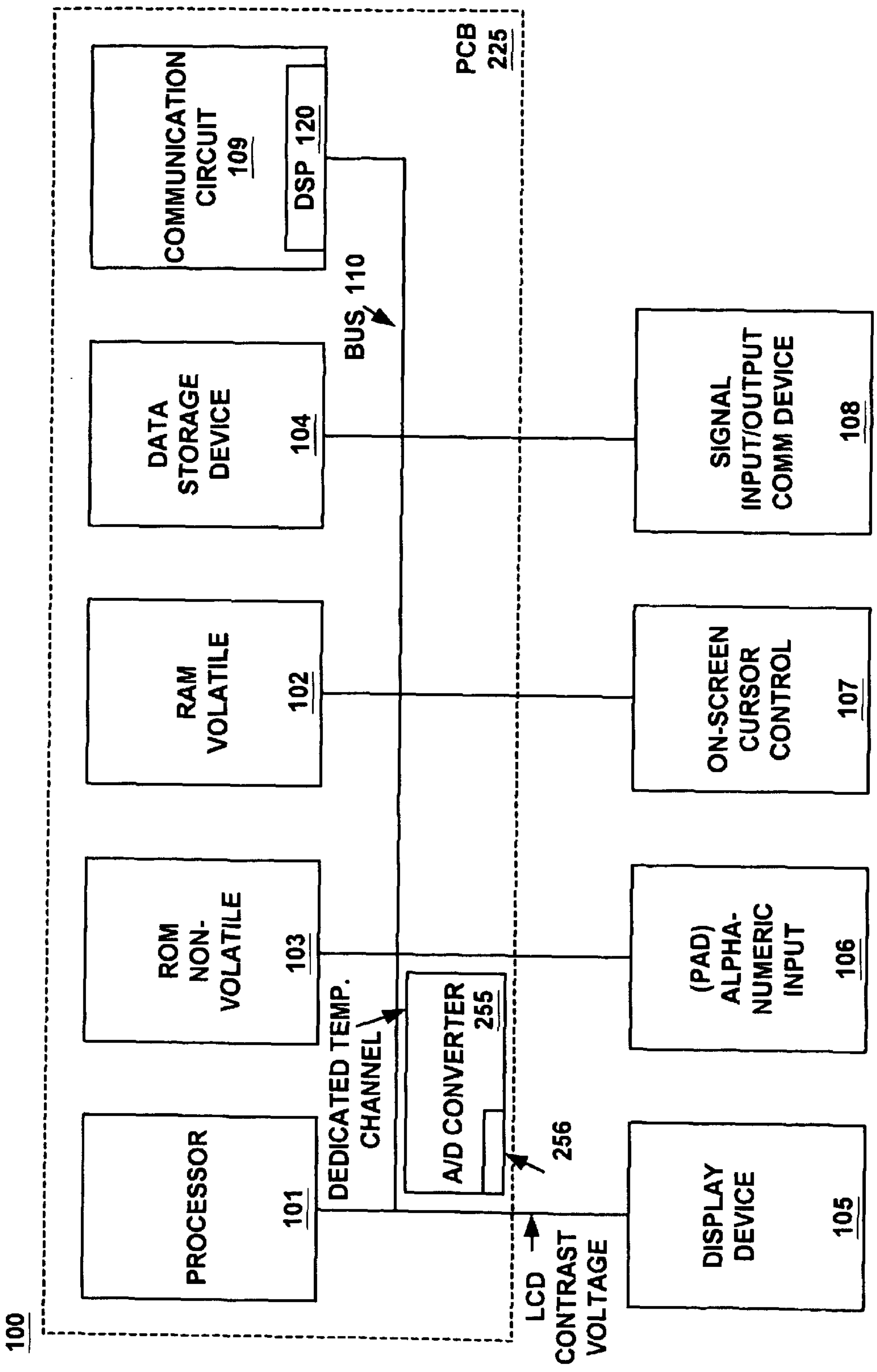
FIG. 4 is a block diagram of one embodiment of a system for sensing and compensating for temperature in the automatic adjustment of LCD display contrast in accordance with the present invention.

FIG. 4 illustrates a block diagram of circuitry of computer system 100, some of which can be implemented on PC board 225 (FIG. 4). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110, with associated contrast control, for displaying information to the computer user. PC board 225 can contain the processor 101, the bus 110, the ROM 103 and the RAM 102.

System 100 also includes temperature sensing circuitry. In one embodiment, a diode 256 is used. PC board 225 also may accommodate an analog-digital (A/D) converter 255, with temperature sensing diode 256, located in a position proximate to the LCD display 105 such that temperature sensing diode 256 senses substantially the same temperature to which the LCD display 105 is exposed.

With reference to FIG. 4, computer system 100 also includes a signal transmitter/receiver device 108, which is coupled to bus 110 for providing a physical communication link between computer system 100, and a network environment. As such, signal transmitter/receiver device 108 enables central processor unit 101 to communicate wirelessly with other electronic systems coupled to the network.

The display device 105 utilized with computer system 100 can be of any design which is sensitive to temperature and which is suitable for generating graphic images and alphanumeric characters recognizable to the user. In one embodiment, a flat panel LCD technology is used. In this embodiment, a contrast control voltage signal can be supplied to device 105, over a dedicated channel, that varies the contrast of display 105. In this way, the processor 101 can control the contrast of device 105, e.g, by controlling the contrast control voltage.

To facilitate processor control of the contrast control voltage, the computer system 100 contains in one embodiment an A/D converter 255 with temperature sensing diode 256. Temperature sensor 255 is connected electrically to the processor 101 by bus 110 in one implementation on a dedicated temperature channel, providing a digital temperature input. In this configuration, processor 101 may execute a program routine that, in one embodiment, compares the digital temperature input to a programmed formula, and correspondingly adjusts the above described LCD contrast voltage to maintain a user preference contrast setting. In another embodiment, processor 101 executes an alternative program routine that indexes the digital temperature input to a programmed lookup table (FIG. 9), and correspondingly adjusts LCD contrast voltage. In both embodiments the result is the same, namely the LCD display drivers are controlled and act accordingly to maintain the LCD display unit's contrast constant (to the user's preference setting) over the entire operational temperature range of the computer.

Figure 5:
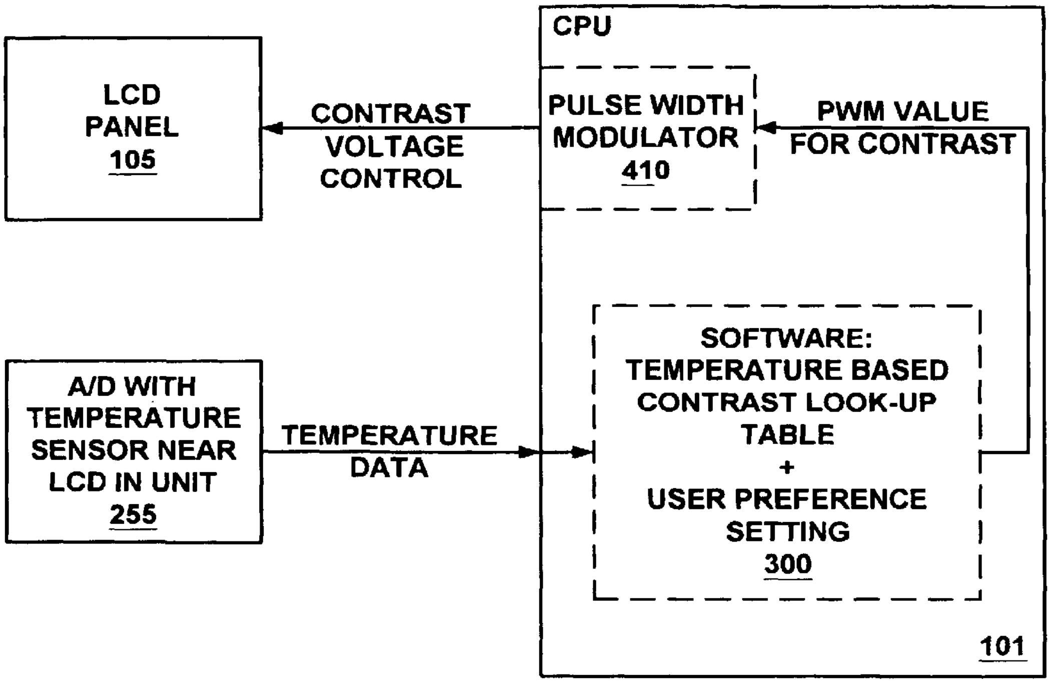
FIG. 5 is a block diagram showing the relationship of components of an embodiment of the present invention for sensing temperature, conversion into a signal supplied to a processor which adjusts supply voltage to a display correspondingly.

Refer now to FIG. 5 which illustrates the general relationship of components in an exemplary process for sensing and compensating for temperature in the adjustment of LCD display contrast in accordance with the present invention. An analog digital (A/D) converter with temperature sensor 255 is mounted proximate to an LCD panel 105 such that the temperature sensor within A/D converter 255 senses substantially the same temperature in which LCD panel 105 operates. The diode generates an analog signal, related to the current temperature, as is well known. A/D converter 255 generates a digital signal corresponding to this ambient operating temperature of LCD panel 105. This signal is sent to the central processing unit (CPU) 101, providing CPU 101 with temperature data. CPU 101 controls a pulse width modulator (PWM) circuit 410 and is programmed with software 300. The pulse width modulator circuit 410 controls the contrast control voltage. In one embodiment, software 300 compares the temperature data to values from a temperature based contrast lookup table and user preferences and generates a PWM contrast value. Within CPU 101, this PWM contrast value generated by software 300 is sent to pulse width modulator circuit 410. Pulse width modulator circuit 410 generates a contrast voltage control signal, which is sent to LCD panel 105 to control contrast accordingly.

Figure 6:
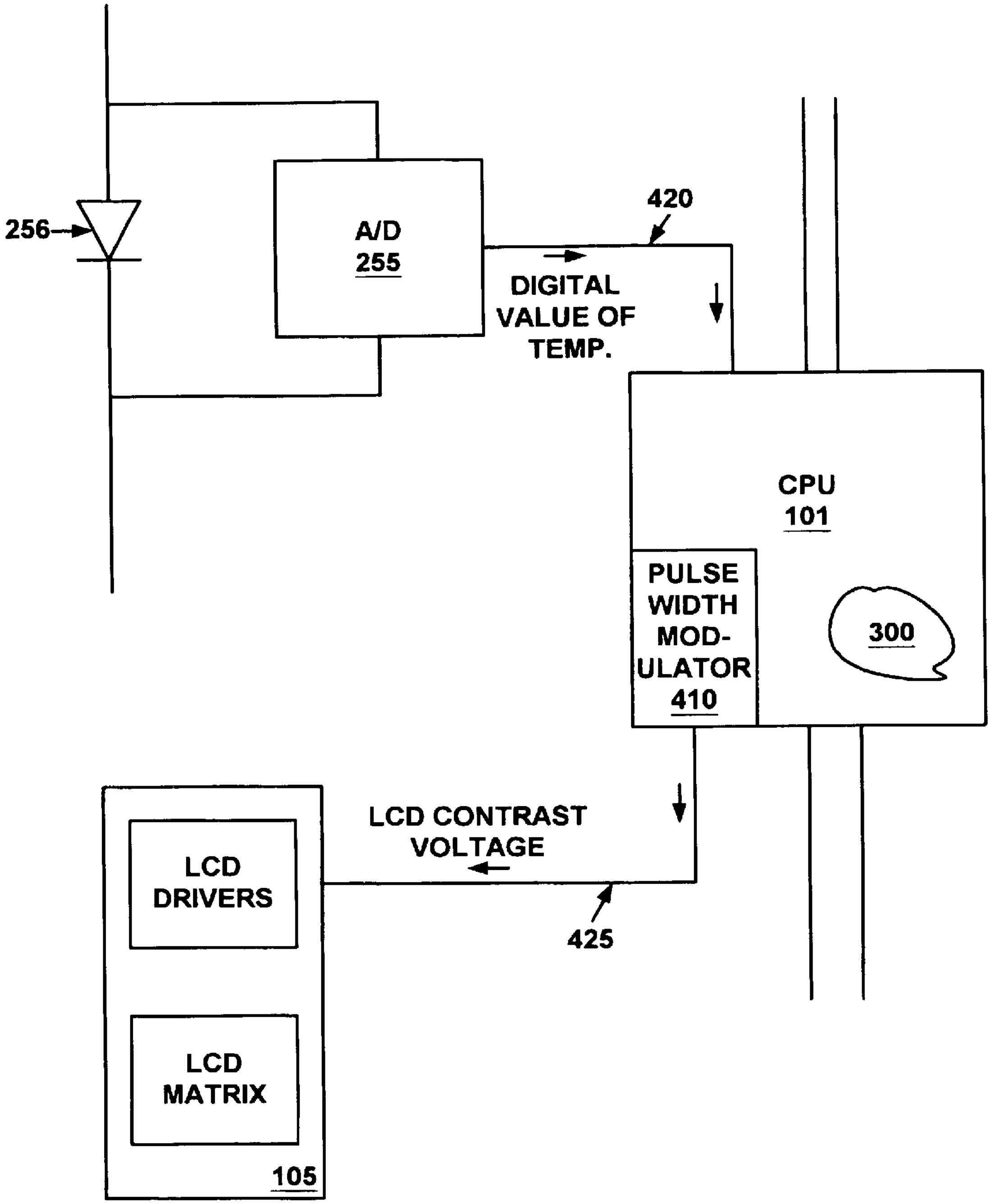
FIG. 6 is a functional diagram showing the components of a system for sensing and compensating for temperature in the automatic adjustment of a display contrast in accordance with one embodiment of the present invention.

Referring to FIG. 6, components of a system for sensing and compensating for temperature in the automatic adjustment of a display contrast in accordance with one embodiment of the present invention are depicted. Temperature sensitive analog diode 256 is a component of analog digital (A/D) converter 255 and senses the ambient operating temperature of display device 105. The voltage drop across diode 256 changes correspondingly with this temperature, as is well known. A/D converter 255 generates a signal corresponding to a digital value of this temperature. This digital temperature signal is transmitted via dedicated temperature channel 420, which in may be a circuit within a bus 110, to CPU 101. Software 300 programmed into CPU 101 executes a routine which responds to this temperature signal to accordingly control a pulse width modulator circuit 410 which may be a component of CPU 101. Pulse width modulator circuit 410 generates a LCD contrast voltage signal in accordance with this programmed control. This LCD contrast voltage signal is transmitted via channel 425, which may be a circuit within bus 110, to LCD drivers within display 105, which in this embodiment control an LCD matrix within display 105 accordingly.

Figure 7:
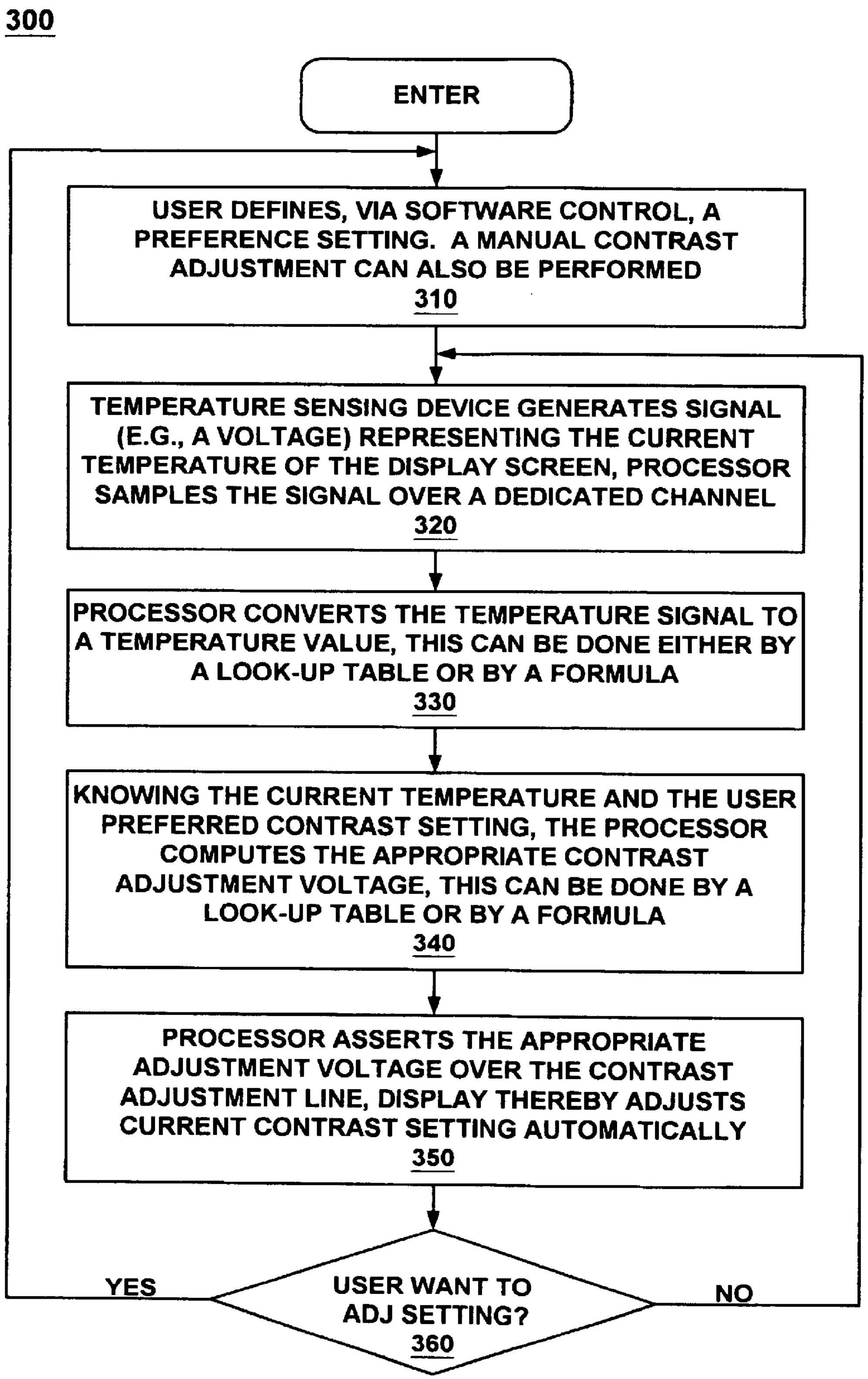
FIG. 7 is a flowchart showing the steps in a process for sensing and compensating for temperature in the automatic adjustment of a display contrast in accordance with one embodiment of the present invention.

FIG. 7 depicts a process 300 that one embodiment of the present invention may apply in display contrast to automatically compensate for temperature. Initially, a user of a portable electronic device determines if adjustment of the device display contrast setting is desired. If so, the user executes step 310, wherein a preferred contrast setting is programmed by the user, through software control, e.g., using a graphical user interface (GUI). Manual control of contrast is also possible without changing the preferred programmed setting by using a manual contrast adjustment.

When a user preferred contrast setting has been programmed (e.g., using the GUI of FIG. 8), or if the programmed setting is not changed, a temperature sensing device monitors the ambient operating temperature of the display and generates a corresponding signal in step 320, which is inputted to a processor over a dedicated channel. The processor converts the temperature signal to a value in step 330 by a programmed lookup table. In another embodiment, the temperature value is derived by a programmed formula. In either embodiment, the processor takes the temperature value and the user preferred contrast setting and in step 340, computes a corresponding appropriate contrast adjustment voltage. The contrast adjustment voltage therefore takes into account the current temperature setting and the user's preference setting. The processor sends the contrast adjustment voltage via a dedicated contrast adjustment line in step 350 to the display, thereby adjusting the contrast setting automatically. If the user decides to change the preferred contrast setting, the user selects the contrast preference setting option in step 360 to access the software control, enabling step 310.

Figure 8:
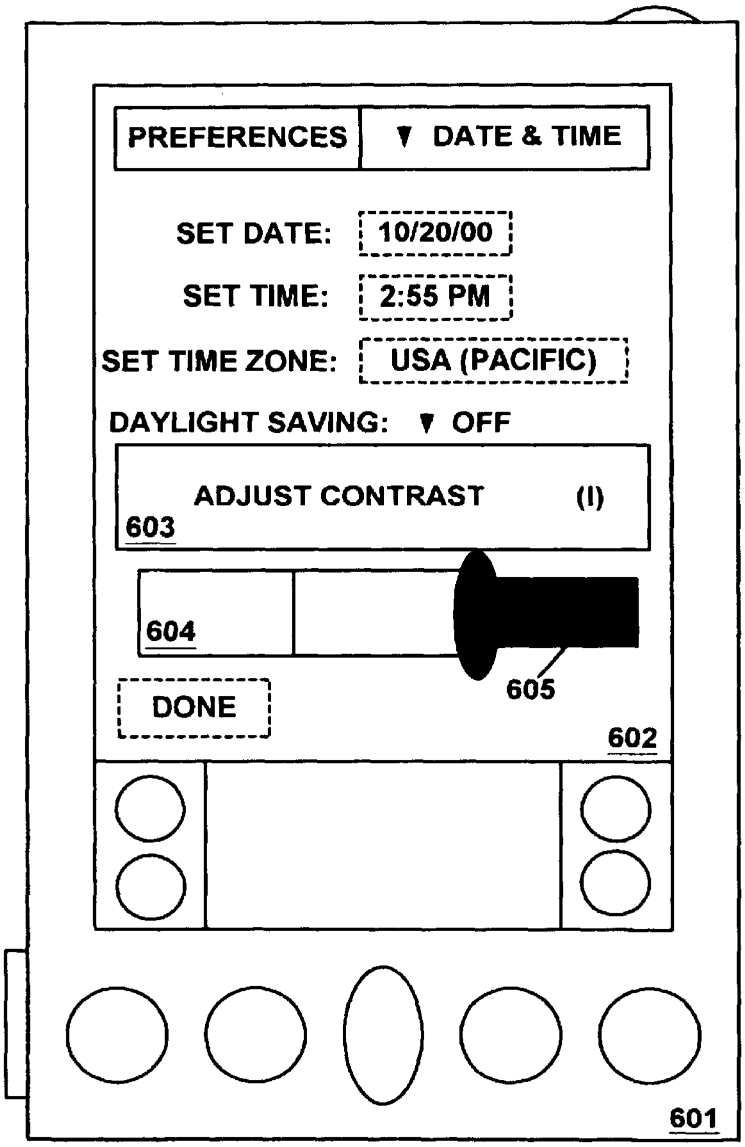
FIG. 8 depicts a graphical user interface displaying a contrast adjustment screen for checking and setting user preference contrast setting.

Referring to FIG. 8, a graphical user interface (GUI) screen face image 600 is depicted within portable computer system 601 wherein one embodiment of the invention enables a user to program a contrast preference setting by manipulating on screen control features. Liquid crystal display (LCD) screen 602 displays a contrast icon 603 upon user calling for a Preferences adjustment feature, and a bar graph 604 displaying a gradient of shadings from light to dark. A user interacts via the GUI 600 to set a preference by manipulating an on screen contrast set cursor slide bar 605. By placing the cursor 605 at a setting indicated by a relative shading gradation on the interactive shading gradient bar graph 604, user designates a setting for contrast preference which GUI 600 inputs to CPU 101 (FIG. 5).

Figure 9B:
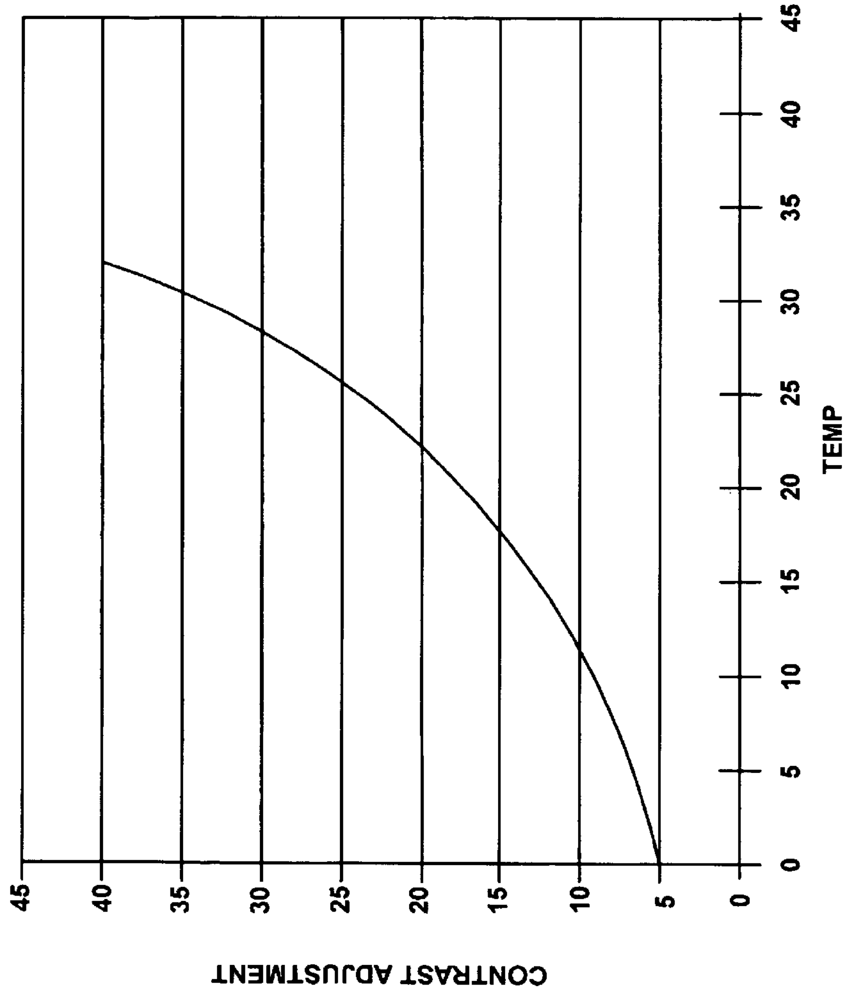
FIG. 9B is a graph of temperature adjustment values corresponding to the Table of Temperature-Contrast Adjustment Values of FIG. 9A.

FIG. 9A depicts a table of Temperature to Contrast Adjustment Values for programmed automatic contrast adjustment in accordance with one embodiment of the invention. A user sets a contrast preferrence by manipulating the contrast slide bar (605, FIG. 8). Software saves the contrast value as well as the temperature. The software monitors the temperature. If the temperature changes, the contrast adjustment values are summed for the range the temperature changed, then added or subtracted accordingly, depending if the temperature increased or decreased. FIG. 9B expresses the Table graphically. For example, a user sets contrast to 70 at 25 degrees. If temperature then falls to 10 degrees, this embodiment of the invention automatically adjusts the contrast accordingly as follows. The contrast adjustment is calculated by adding 19+14+10=43. Then, that adjustment is subtracted from the current contrast value, 70−43=27, the new corresponding contrast value. The Table row shows the temperature and adjustment value needed to adjust the contrast if the temperature rose 5 degrees from the row temperature.

In summary, in accordance with one embodiment of the present invention, when a device such as portable computer system 100 is operated, the ambient temperature of its operating environment is sensed and inputted to the computer system's processor, which automatically adjusts display contrast correspondingly to maintain a user programmed contrast preference. Display contrast is automatically adjusted over the entire range of operating temperature with no requisite user action. This automatic display contrast adjustment in response to ambient operating temperature will prevent extreme display screen brightness or darkness due to varying the ambient operating temperature, with any user contrast preference setting. Thus, one embodiment of the present invention provides a system and method that can dispense with display contrasts becoming sub-optimal or disabled by temperature with resultant periods of computer inefficiency or uselessness, and potentially futile manual user contrast adjustments upon temperature change. Furthermore, it will help prevent users from mistakenly believing that their computers have stopped operating or that they have lost data, thereby dispensing with users' unnecessary replacement of either data or computers, or mistaken unnecessary service requests on satisfactory computers. In these ways, the present invention promotes convenience and saves time, cost, and effort.

While the present invention has been described in particular embodiments, it should be appreciated that the present invention should not be construed as limited by such embodiments, but rather construed according to the below claims.

What is claimed is:

1. In an electronic device having a display and a processor, a method for providing contrast adjustment for said display comprising:

a) receiving a contrast setting that is user defined via a software graphical user interface, wherein said graphical user interface comprises an interactive slide bar and wherein said electronic device comprises a portable hand held computer system;

b) generating signals representative of an ambient temperature of an environment of said display over time, said ambient temperature characterizing said environment;

c) sampling said signals and converting said signals into current temperature values;

d) based on said contrast setting and said current temperature values, computing a first contrast adjustment voltage signal for maintaining said contrast setting, wherein said c) and d) are performed by said processor;

e) automatically adjusting contrast of said display by applying said first contrast adjustment voltage signal to said display; and f) repeating said b)–e), for a second contrast adjustment, wherein a second contrast adjustment voltage signal is computed and wherein said e) further comprises summing said second contrast adjustment voltage signal and said first contrast adjustment voltage signal.

2. The method as recited in claim 1 wherein said b) comprises using a temperature sensitive diode circuit to generate a voltage signal based on said ambient temperature.

3. The method as recited in claim 2 wherein said b) further comprises using an analog to digital converter to convert said voltage signal into a digital value.

4. The method as recited in claim 1 wherein said d) comprises indexing a look-up table with said contrast setting and said current temperature values to compute said contrast adjustment voltage signal.

5. The method as recited in claim 1 wherein said step d) comprises inputting said contrast setting and said current temperature values to a formula to compute said contrast adjustment voltage signal.

6. The method as recited in claim 1 wherein said display comprises a liquid crystal display (LCD) display screen.

7. A portable, hand held electronic computing device comprising:

a processor coupled to a bus;

a display coupled to said bus and responsive to a contrast adjustment signal;

a temperature sensing circuit coupled to said bus for generating signals representative of an ambient temperature of an environment of said display over time, said ambient temperature characterizing said environment, wherein said processor automatically compensates display contrast based on said ambient temperature by performing a process comprising:

a) receiving a contrast setting that is user defined via a software graphical user interface, wherein said graphical user interface comprises an interactive slide bar;

b) sampling said signals and converting said signals into current temperature values;

c) based on said contrast setting and said current temperature values, computing a first contrast adjustment voltage signal for maintaining said contrast setting;

d) automatically adjusting contrast of said display by applying said first contrast adjustment voltage signal to said display; and e) repeating said b)–d). for a second contrast adjustment, wherein a second contrast adjustment voltage signal is computed and wherein said e) further comprises summing said second contrast adjustment voltage signal and said first contrast adjustment voltage signal.

8. The device as recited in claim 7 wherein said temperature sensing circuit comprises:

a temperature sensitive diode circuit for generating a voltage signal based on said ambient temperature; and an analog to digital converter to convert said voltage signal into a digital value.

9. The device as recited in claim 7 wherein said c) comprises indexing a look-up table with said contrast setting and said current temperature values to compute said contrast adjustment voltage signal.

10. The device as recited in claim 7 wherein said c) comprises inputting said contrast setting and said current temperature values to a formula to compute said contrast adjustment voltage signal.

11. The device as recited in claim 7 wherein said display screen comprises a liquid crystal display (LCD) display screen.

12. A portable hand held computer system comprising:

a processor coupled to a bus;

a flat panel display coupled to said bus and responsive to a contrast adjustment signal;

a temperature sensitive diode circuit for generating signals representative of an ambient temperature of an environment of said display over time, said ambient temperature characterizing said environment, wherein said processor automatically compensates display contrast based on said ambient temperature by performing a process comprising:

a) receiving a contrast setting that is user defined via an interactive slide bar of a software graphical user interface displayed on said display;

b) sampling said signals and converting said signals into current temperature values;

c) based on said contrast setting and said current temperature values, computing a first contrast adjustment voltage signal for maintaining said contrast setting;

d) automatically adjusting contrast of said display by applying said first contrast adjustment voltage signal to said display; and e) repeating said b)–d), for a second contrast adjustment, wherein a second contrast adjustment voltage signal is computed and wherein said e) further comprises summing said second contrast adjustment voltage signal and said first contrast adjustment voltage signal.

13. The portable hand held computer system as recited in claim 12 further comprising an analog to digital converter to convert said signals from said temperature sensitive diode circuit into digital values.

14. The portable hand held computer system as recited in claim 12 wherein said c) comprises indexing a look-up table with said contrast setting and said current temperature values to compute said contrast adjustment voltage signal.

15. The portable hand held computer system as recited in claim 12 wherein said c) comprises inputting said contrast setting and said current temperature values to a formula to compute said contrast adjustment voltage signal.

16. The portable hand held computer system as recited in claim 12 wherein said display screen comprises a liquid crystal display (LCD) display screen.

* * * * *